(No Model.)

W. H. & C. A. HOLCOMBE.
PUMP CYLINDER.

No. 269,523. Patented Dec. 26, 1882.

Witnesses:
O. B. Olmsted
P. G. Shuu

Inventors:
William H. Holcombe
Clifford A. Holcombe

UNITED STATES PATENT OFFICE.

WILLIAM H. HOLCOMBE AND CLIFFORD A. HOLCOMBE, OF BELOIT, WIS.

PUMP-CYLINDER.

SPECIFICATION forming part of Letters Patent No. 269,523, dated December 26, 1882.

Application filed August 7, 1882. (No model.)

*To all whom it may concern:*

Be it known that we, WILLIAM H. HOLCOMBE and CLIFFORD A. HOLCOMBE, citizens of the United States, residing at Beloit, county of Rock, and State of Wisconsin, have invented certain new and useful Improvements in Pump-Cylinders, of which the following is a specification.

Our invention relates to improvements in pump-cylinder, in which the cylinder-barrel is in two parts, with the ends beveled to correspond with each other, with a self-adjusting packing, and a water-space between the packing and barrel.

The objects of our invention are, first, to make a self-adjusting packing; second, to provide an open space for water between the packing and the cylinder-barrel; third, to save expense of boring and polishing the barrel; and, fourth, to lessen the friction and resistance of the plunger or sucker in its upward movement. We accomplish these objects by the mechanism illustrated in the accompanying drawings, in which—

Figure 1:
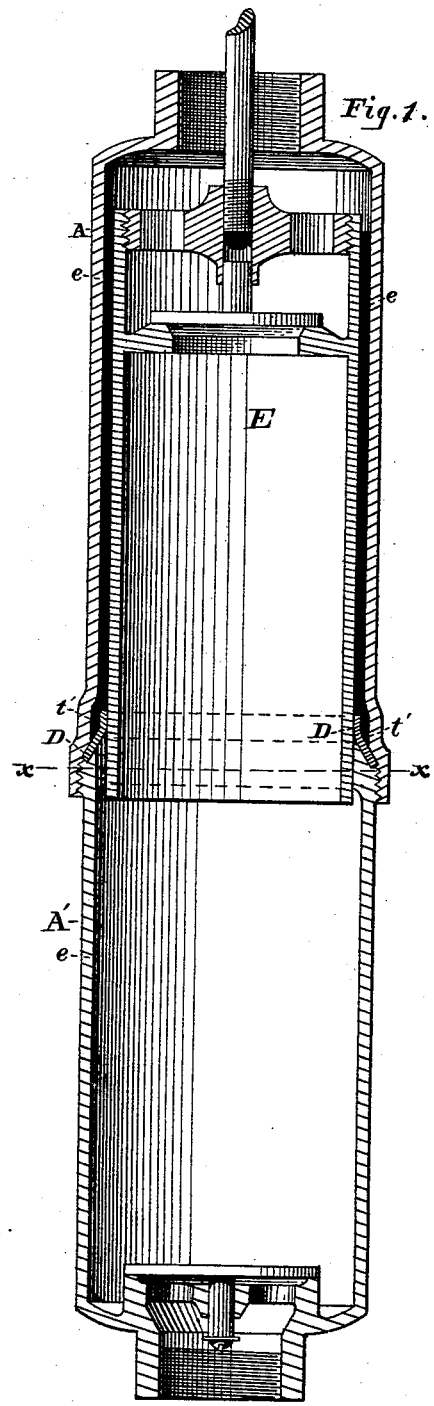
Figure 2:
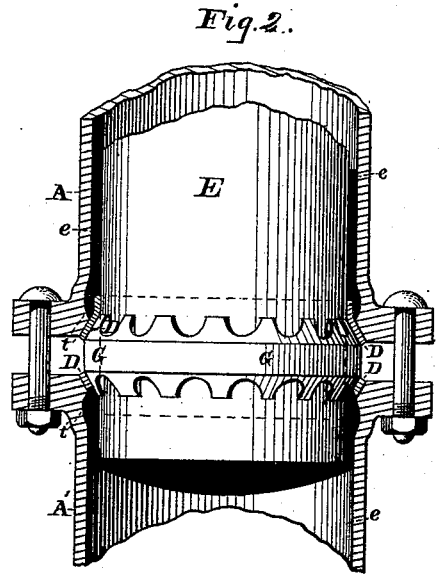
Figure 3:
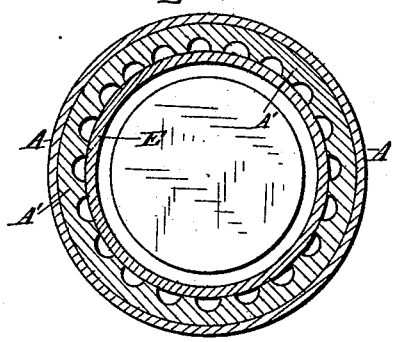

Figure 1 is a sectional elevation through the longitudinal center of the cylinder; and Fig. 2 is a similar view of a section, showing how a metal ring may be used with beveled faces to hold packing in a double-acting cylinder; Fig. 3, a cross-section on the line *x x* of Fig. 1.

Similar letters refer to like parts in the different views.

The section A' of the cylinder is drawn inward or contracted at its upper end, thereby forming a supporting-ledge for the packing and a short guide or bearing for the piston E, which being of considerably smaller diameter than the interior of the main body of the cylinder leaves a space or annular chamber, *t'*, between the piston and cylinder, as shown in Fig. 1.

The two parts of the barrel are threaded, and, when screwed together, the beveled surfaces hold the packing D firmly in place and at an angle to the cylinder and when the sucker or plunger E is in position the inner edge of the packing, which is of leather or any other suitable material, fits tightly around the plunger and prevents the passage of water down around the outside of the plunger. The movement of the plunger E upward, when pumping, has a tendency to lift the upper edge of the packing and lessen the friction; but the pressure of the water at *t'*, Fig. 1, holds the packing against the plunger to prevent water passing downward. Packing put in in this way is stationary and self-adjusting, and does not depend upon any packing-nut or other device to keep tight around the plunger.

In Fig. 2, G is a metal ring, with upper and lower surfaces beveled to correspond with bevels on the upper and lower parts of the cylinder, and two leather or other packing-rings (indicated by letters D) are used, and in this way our device may be readily adapted to a double-acting cylinder.

Instead of providing the elongated piston with a valve, it may be made solid, and the packing-ring D made to act both as a valve and a packing, the downward pressure of the piston upon the water in the cylinder causing the water to rise and pass upward between said piston and the packing, D, which, being flexible and extending upward in an inclined position, will yield to the pressure of the water. When, however, the piston rises the pressure of the water above the packing will hold the latter in contact with the piston and prevent the downward passage of the water. In such case the lower end of the cylinder will be closed and provided with an upwardly or inwardly opening valve, and the contracted guiding portion of the cylinder will be channeled or grooved to permit the water to pass without destroying the guide; or the contraction may be omitted and the flexible packing made to act also as a guide.

We do not broadly claim a packing held between the ends of two cylinder-sections screwed or fastened one to the other; nor do we claim a pump in which a piston passes through a contracted portion or guide formed in the cylinder. We however believe ourselves to be the first to utilize the packing for the purposes of a valve, and we also believe ourselves to be the first to employ a beveled metal ring of larger diameter than the interior of the cylinder, to hold the packing ring or sheet in place, and to form a supporting-ledge for the packing.

It will of course be understood that when the ring G is employed and the packing is made to serve also as a valve the lower packing-strip will not project over the channels or passages in the ring, as they would then interfere with the upward passage of the water, the upper packing being sufficient to prevent leakage around the piston.

Having described our invention, what we claim, and desire to secure by Letters Patent, is—

1. In combination with the cylinder-sections A A', having beveled mouths, as shown, and the packing-rings D D, the beveled ring G, placed between the packing-rings, and projecting outward between the ends of the cylinder-sections, as shown and described, whereby said beveled ring is clamped and held firmly in place between the sections, and the packing-rings are clamped between the sections and the ring.

2. In combination with the sections A A' and packing-rings D D, extending to and bearing against the piston, the intermediate clamping-ring, G, as and for the purpose set forth.

3. In a pump, the combination of a cylinder having an inwardly-opening valve at its lower end, an elongated piston of materially smaller diameter than the interior of the cylinder, whereby an annular water-space between the piston and cylinder is afforded, a flexible packing extending inward and upward from the cylinder to the piston, whereby it is adapted to permit the passage of water upward between the cylinder and piston, but to prevent its passage downward, and a supporting-ledge beneath the packing, provided with one or more water passages or channels, substantially as shown and described.

WILLIAM H. HOLCOMBE.
CLIFFORD A. HOLCOMBE.

Witnesses:
J. B. Dow,
Isaac Buckeridge.